April 4, 1967 L. W. FLECKENSTEIN ET AL 3,312,149
CYLINDER CONSTRUCTION
Filed July 7, 1965

INVENTORS.
LAMBERT W. FLECKENSTEIN
ANDREW J. FLECKENSTEIN
BY
Malcolm A. Bradway
ATTORNEY.

United States Patent Office 3,312,149
Patented Apr. 4, 1967

3,312,149
CYLINDER CONSTRUCTION
Lambert W. Fleckenstein, 4445 N. 135th, and Andrew J. Fleckenstein, 13650 Squirrel Drive, both of Brookfield, Wis. 53005
Filed July 7, 1965, Ser. No. 469,996
5 Claims. (Cl. 92—170)

The present invention is directed to new and useful improvements in cylinder and piston actuator assemblies and particularly with improvements which facilitate manufacture of such assemblies.

The commonly used, present-day piston and cylinder actuators are typically comprised of a cylinder which is formed as a cylinder barrel with separate end caps or blocks which are connected with the barrel to close the end of the barrel and thus make the cylinder. Special techniques and devices are used to properly seal the cylinder barrel and end caps, so as to prevent leakage of fluid from the cylinder. Both the interior of the cylinder barrel and the working surface of the piston are usually highly finished for a precision fit therebetween. The piston customarily carries one or more piston rings for engagement with the interior wall of the cylinder so as to divide the space on opposite sides of the piston or piston rings into separate pressure spaces, whereby the piston may be caused to reciprocate due to application of pressurized fluid to one or the other of the spaces.

With the foregoing in mind, the major purposes of the present invention are to form a piston and cylinder actuator with a minimum number of parts, while reducing the number of machining operations which are otherwise necessary for the assembly and operation of other actuators. A related purpose of the invention is to so form a cylinder and piston actuator that a single seal performs the function of sealing different sections of the cylinder against leakage while at the same time serving as the normal piston to cylinder seal, thereby eliminating the need for a piston carried sealing ring as well as sealing rings for the various joints between cylinder sections.

These and other purposes of the present invention will become more apparent in the course of the ensuing specification and claims, when taken with the accompanying drawings, in which:

Like elements are designated by like characters throughout the specification and drawings.

Figure 1:
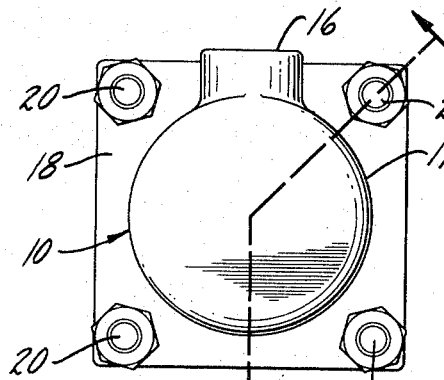
FIGURE 1 is an end view of a typical cylinder constructed in accordance with the present invention.

With specific reference now to the drawings and in the first instance to FIGURE 1, the numeral 10 designates generally a cylindrical body which is comprised of plural sections 11 and 12. One section, as for example section 12, has a bearing 13 to receive a piston rod 14 which extends longitudinally therethrough and which is fixed to a piston 15 which is adapted for reciprocation within the cylinder. Opposite end portions or axially spaced portions of the sections 11 and 12 have inlet and outlet ports 16 and 17 formed therein. It should be understood that the ports 16 and 17 may be provided with suitable fittings for coupling fluid conduits thereto in a fashion conventional to the art. Sections 11 and 12 may be formed from simple castings in the general form and proportions illustrated in the drawings. The sections have inner end portions formed with flanges 18 and 19, respectively, for a mating engagement with one another. A plurality of nut and bolt fasteners 20 are equally spaced about the axis of the cylinder and are passed through the flanges so as to hold the two sections 11 and 12 together. One section, as for example the section 11, may have a tongue-like portion or ring 21 which is received against an annularly formed recess and shoulder 22 in the other section 12. The inner annular surface of the tongue provides a seat 23 for a seal ring 24. Sections 11 and 12 have annularly extending projecting portions 25 and 26 which extend inwardly slightly from the remainder of the interior surface of the cylindrical sections and which have means for gripping and slightly compressing the seal ring 24.

In a preferred form of the invention, the seal ring 24 has spaced, peripherally extending outer lobes 27 and 28 which engage against the recess surface 23, and against the projecting portions 25 and 26. The ring has inner curvilinear lobes 29 and 30 which extend annularly around the ring and which are adapted for engagement with the confronting wall of the piston 15. Lobes 27 and 28 may be joined by an outwardly concave, annular surface 31, while the lobes 29 and 30 may be connected by an essentially flat, annular surface 32, which is spaced outwardly of the lobes 29 and 30. The ring body is further characterized by recessed surfaces forming abutments 33 and 34 which extend parallel to the axis of the cylinder and which extend around the periphery of the ring body. The projecting portions 25 and 26 have surfaces generally matching these recesses at the sides of the ring, so as to grip the ring and preclude inward displacement or twisting thereof. The ring cross-section is the same as that illustrated in FIGURE 3 throughout the periphery of the ring.

Figure 3:
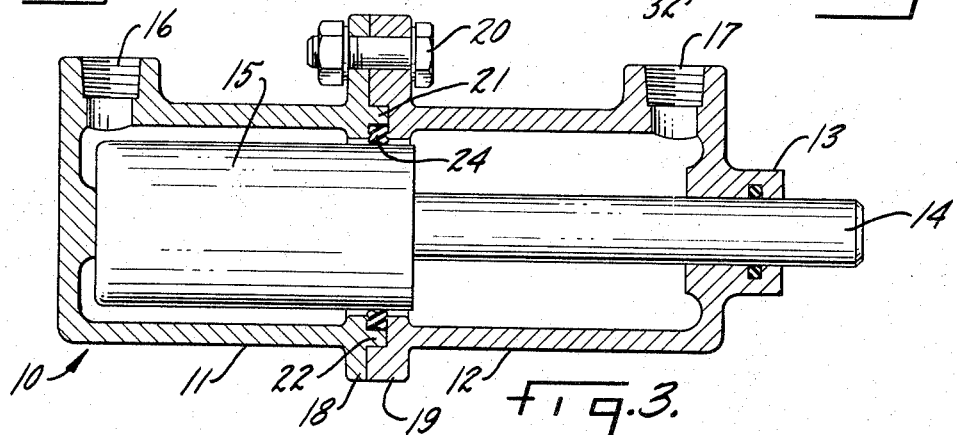
FIGURE 3 is a sectional view of the cylinder illustrated in FIGURE 1 and taken on the section lines 3—3 of FIGURE 1.

The ring body of FIGURE 3 may be formed from an elastomeric material equivalent to approximately 60 to 70 durometer rubber. Ring 24 may be formed precisely in the manner described in our copending application Ser. No. 434,894, filed on Feb. 24, 1965.

Figure 4:
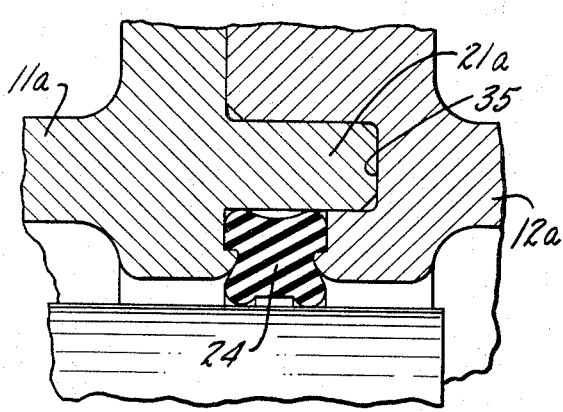
FIGURE 4 is an enlarged detailed view similar to FIGURE 3 while illustrating a modification of the sealing means.

FIGURE 4 illustrates a further modification in and to the invention. In FIGURE 4, sections 11 and 12 are identical to the sections 11 and 12 of FIGURE 2, with the exception that the ring 21a is received within a groove 35 in the section 12a. Thus, slight separation of the sections 11a and 12a, which may occur with high pressure forces, prevents a crack from appearing which would be exposed to the seal ring 24, thus preventing extrusion of the ring 24.

Figure 5:
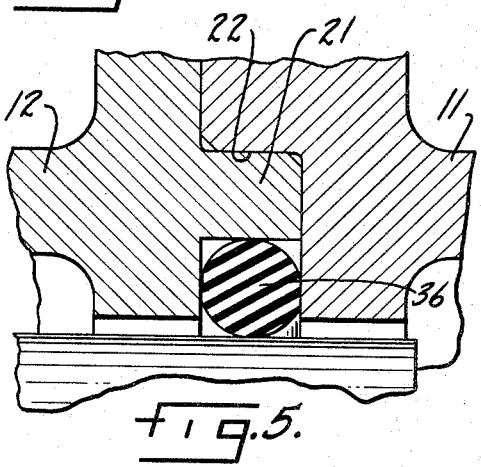
FIGURE 5 is an enlarged sectional view illustrating another variant form of sealing means utilized with the invention.

FIGURE 5 illustrates a further modification. In FIGURE 5, the cylinder sections 11 and 12 are substantially identical to the sections 11 and 12 in FIGURE 2 except that projections 25 and 26 are omitted. A seal ring 36, of a form typically characterized as a conventional resilient O-ring, is positioned in the recess defined by tongue 21 and the confronting walls of the sections 11 and 12 in lieu of the specially formed ring 24 which is illustrated in FIGURE 3. Ring 36 engages the outer wall of piston 15 and the walls of the recess.

Figure 2:
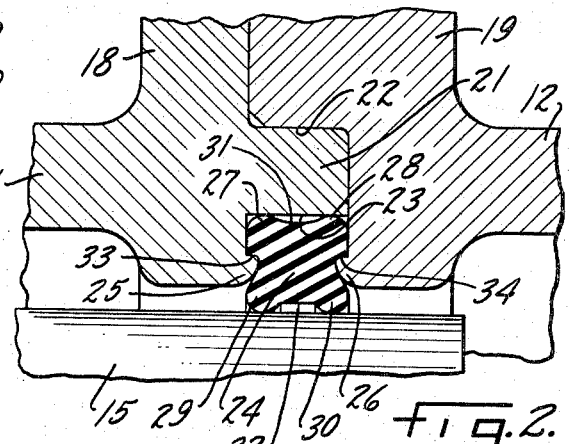
FIGURE 2 is an enlarged sectional view illustrating the novel sealing means incorporated in the present invention.

In each form of the invention, the wall of the piston is spaced from the opposed wall of the cylinder. The only engagement occurs between the piston wall and the seal ring, which extends inwardly beyond the innermost portion of the remainder of the interior cylinder wall. The seal ring itself thus divides the space within the cylinder into separate pressure spaces on opposite sides of the piston. Admission of fluid under pressure through one port, as for example port 16, at a pressure greater than that existing at the other port, will work against the piston 15 to cause movement thereof to the right as illustrated in FIGURE 2. When the greater pressure exists in the right-hand space, the piston will move to the left in FIGURE 2.

In manufacturing actuators of the type described and illustrated herein, the cylinder sections can be formed of simple castings with only the mating surfaces of the flanges, rings and shoulders being machined. The inlet and outlet ports will be machined as usual as will the bearing facilities utilized for piston rod 14. Thus the previous customary operations of highly finishing the interior surface of the cylinder and finishing end caps and the cylinder barrel for proper joinder and use of seal rings therein may be omitted. The seal ring at the joint between the two or more sections serves to both provide a static seal to prevent escape of pressure at the joint between the two sections as well as a dynamic seal with the piston to divide the cylinder space into separate pressure and/or working spaces.

It should be understood that the cylinder which is formed in accordance with the description hereof can be provided with other customary features, as for example bleed ports, dash pot facilities, etc. Also, the piston 15 can be provided with a piston rod extending through both opposite ends of the cylinder so as to provide the greater support for the piston if deemed necessary.

While the invention is described with respect to actuators, it should be understood the the principles hereof can be applied to piston and cylinder types of valves in which axially spaced separate pressure spaces are provided within the valve.

In all forms of the invention, the cylindrical sections and piston are relatively proportioned so that the outer and inner annular surfaces of the seal ring are pressed against the outer wall of the recess between adjoining sections of the cylinder barrel and the confronting cylindrical wall of the piston to thereby create an effective seal at both places. Axial squeezing of the seal ring, as accomplished by the projections carried at the adjoining portions of the barrel sections facilitates this result. In all forms of the invention, the seal rings function to provide a piston cylinder seal while also sealing the joint between adjoining cylinder sections.

Whereas we have shown and described an operative form of the invention, it should be understood that this showing and description thereof should be taken in an illustrative or diagrammatic sense only. There are many modifications in and to the invention which will be apparent to those skilled in the art and which will fall within the scope and spirit thereof. The scope of the invention should be limited only by the scope of the hereinafter appended claims.

We claim:
1. A piston and cylinder for dividing a cylinder into separate pressure spaces including plural, adjoining, cylindrical sections defining a multi-section cylinder barrel, means defining the closed ends of said cylinder, a piston positioned within said barrel, ports for admitting and exhausting fluid from axially spaced portions of said sections, said adjoining sections having interfitting confronting portions defining a circumferentially extending groove opening into said cylinder, said groove having an outer wall and side walls extending generally radially of the cylinder, a seal ring positioned in said groove and having an outer surface engageable with said outer wall of said groove, said seal ring having plural spaced lobes projecting inwardly beyond the innermost portions of the cylinder wall of said sections and in sealing engagement with said piston, said ring having recesses in the sides thereof, the side walls of said sections defining said grooves including portions fitting said recesses to thereby captivate said ring, said seal ring serving to divide the space within said cylinder into separate pressure spaces on opposite sides of said ring while serving to seal the joint between said sections.

2. The structure of claim 1 wherein said piston includes a piston rod extending through the closed end of one of said cylinder sections.

3. The structure of claim 1 wherein said ring includes plural spaced and circumferentially extending outer lobes engaged with the outer wall of said groove.

4. The structure of claim 1 wherein the recesses in the sides of said ring and the portions of said sections fitting into said recesses extend circumferentially of said ring and cylinder.

5. The structure of claim 1 wherein said recesses include surfaces positioned at the outermost portions of said recesses which extend generally parallel to the axis of said cylinder and said portions of said sections also include matching surfaces extending generally parallel to the axis of said cylinder.

References Cited by the Examiner

UNITED STATES PATENTS

| | | | |
|---|---|---|---|
| 239,960 | 4/1881 | Jay | 92—170 X |
| 980,518 | 1/1911 | Harley | 92—170 |
| 1,031,323 | 7/1912 | Christensen | 92—170 |
| 3,007,723 | 11/1961 | Clarke | 92—168 X |
| 3,098,660 | 7/1963 | Hausner | 277—206.1 X |
| 3,215,441 | 11/1965 | Horvereid | 277—188 X |
| 3,224,455 | 12/1965 | Alfieri | 277—206.1 X |

MARTIN P. SCHWADRON, *Primary Examiner.*

I. C. COHEN, *Assistant Examiner.*